United States Patent
Cable et al.

(10) Patent No.: US 9,488,820 B2
(45) Date of Patent: Nov. 8, 2016

(54) AUTOFOCUS SYSTEM

(71) Applicant: Thorlabs, Inc., Newton, NJ (US)

(72) Inventors: Alex Ezra Cable, Newton, NJ (US); Jeffrey S. Brooker, Oak Hill, VA (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 14/682,581

(22) Filed: Apr. 9, 2015

(65) Prior Publication Data

US 2015/0293340 A1 Oct. 15, 2015

Related U.S. Application Data

(60) Provisional application No. 61/978,087, filed on Apr. 10, 2014, provisional application No. 62/006,972, filed on Jun. 3, 2014.

(51) Int. Cl.
| | |
|---|---|
| *G02B 7/28* | (2006.01) |
| *G02B 21/24* | (2006.01) |
| *G02B 21/06* | (2006.01) |
| *G02B 21/26* | (2006.01) |
| *G02B 6/10* | (2006.01) |
| *G02B 21/36* | (2006.01) |

(52) U.S. Cl.
CPC ............ *G02B 21/245* (2013.01); *G02B 6/102* (2013.01); *G02B 7/28* (2013.01); *G02B 21/06* (2013.01); *G02B 21/26* (2013.01); *G02B 21/361* (2013.01)

(58) Field of Classification Search
CPC . G02B 6/26; G02B 7/28–7/40; G02B 21/06; G02B 21/0052–21/006; G02B 21/241; G02B 21/244–21/245; G02B 21/361; G02B 21/365; G02B 21/367; G03B 3/06
See application file for complete search history.

(56) References Cited

U.S. PATENT DOCUMENTS

| | | | | | |
|---|---|---|---|---|---|
| 5,994,690 | A | * | 11/1999 | Kulkarni | A61B 5/7257 250/216 |
| 7,443,513 | B2 | * | 10/2008 | Rembe | G02B 21/0056 356/511 |
| 7,602,501 | B2 | * | 10/2009 | Ralston | G01N 21/4795 356/497 |
| 7,936,462 | B2 | * | 5/2011 | Jiang | G01B 9/02004 356/497 |

(Continued)

FOREIGN PATENT DOCUMENTS

| | | |
|---|---|---|
| EP | 2107406 A1 | 7/2009 |
| WO | 2006042696 A1 | 4/2006 |
| WO | 2011047365 A1 | 4/2011 |

OTHER PUBLICATIONS

International Search Report mailed Jul. 2, 2015 in corresponding international application No. PCT/US2015/025113.

*Primary Examiner* — Derek S Chapel
(74) *Attorney, Agent, or Firm* — Graham Curtin, P.A.

(57) ABSTRACT

An autofocus apparatus is capable of detecting the position of a sample on a microscope. The sample may consist of a specimen mounted between a microscope slide and coverslip or specimens within a well plate. The device tracks the position of a sample by identifying refractive index boundaries through Fresnel reflections. A change in refractive index can correspond to the top and bottom of a coverslip, the top of a slide, the bottom of a well plate or the bottom of a well within a well plate. Using optical coherence tomography (OCT) these reflections are used to form a depth scan of the sample which gives the positions of these surfaces relative to the objective. The device functions as an autofocus system by compensating for any variation of the position of the sample from the focal plane of the objective.

11 Claims, 2 Drawing Sheets

(56) References Cited

U.S. PATENT DOCUMENTS

| | | | |
|---|---|---|---|
| 7,982,864 B2 * | 7/2011 | Nakamura | A61B 5/0075 356/300 |
| 8,705,047 B2 * | 4/2014 | Jiang | G01B 9/02004 356/450 |
| 2004/0075840 A1 | 4/2004 | Andersen et al. | |
| 2009/0237501 A1 * | 9/2009 | Lemmer | G01N 21/6458 348/79 |
| 2010/0231896 A1 * | 9/2010 | Mann | G01B 9/021 356/73 |
| 2010/0315708 A1 * | 12/2010 | Amberger | G02B 21/06 359/389 |
| 2013/0342902 A1 * | 12/2013 | Krueger | G02B 21/242 359/383 |
| 2014/0028997 A1 * | 1/2014 | Cable | G01B 9/02091 356/51 |

* cited by examiner

AUTOFOCUS SYSTEM

CROSS-REFERENCE TO RELATED APPLICATIONS

This application claims the benefit of U.S. Provisional Application No. 61/978,087 filed on Apr. 10, 2014, and U.S. Provisional Application No. 62/006,972 filed on Jun. 3, 2014. The disclosures of U.S. Provisional Application No. 61/978,087 and U.S. Provisional Application No. 62/006,972 are hereby incorporated by reference.

FIELD OF THE INVENTION

The invention generally relates to a microscopy apparatus, and more particularly to techniques for automatically adjusting the position of a stage for attaining proper focus.

BACKGROUND

As with all optical systems, microscopes suffer from diminished depth of field as the magnification and the NA (numerical aperture) of the imaging lens (objective) increases. When using a microscope, the user is responsible for attaining proper focus of the sample by moving the sample relative to the objective. When microscopy is automated and the user is no longer involved in looking at each image, a method of auto focusing is required. In the related art, techniques that achieve automatic focus by gauging the distance between the front lens and the bottom of the container (e.g., slide, well plate, etc.) are described. Such techniques are based on reflecting a beam of light off of the first surface and measuring the reflection. The deficiency of such techniques, however, is that if the container that the sample is on has an inconsistent thickness, as in most plastics, then the resulting image can be off in focus the amount of the deviation of the substrate.

Cellular imaging relies on the growth of cells on the bottom of a glass or plastic substrate. The cells grow parallel to the surface and secrete proteins that cause them to adhere to the substrate. In order to maintain the growth of the cells, nutrient rich liquid medium is added to feed the cells and maintain proper physiological conditions. In this scenario, the surface of the plastic is covered in an aqueous solution, which can be used to detect the position of the cells. The index of refraction change between the plastic and the liquid can be located using a low noise, high sensitivity reflected light setup.

SUMMARY

In an embodiment, an autofocus microscope apparatus is provided. The apparatus includes: a light source; an optical coupler having a first port, second port, a third port and a fourth port; wherein light output from the light source is coupled to the first port and splits into a first light beam and a second light beam, the first light beam being output to the second port and the second light beam being output to the third port, and wherein the forth port is coupled to an input of a spectrometer; a first optical collimator for directing the first light beam from the second port of the optical coupler onto a sample through a Dichroic mirror and a microscope objective, wherein the sample is placed on a substrate supported by an adjustable microscopy stage; a second optical collimator for directing the second light beam from the third port of the optical coupler onto a retroreflector; wherein the first light beam reflected from the sample is directed back into the second port and out of the fourth port, and second light beam reflected from the retroreflector is directed back into the third port and out of the fourth port; wherein the spectrometer output control signals to control the adjustable microscopy stage based on an interference signal from the reflected first and second light beams.

In another embodiment, a method for operating a microscopy apparatus is provided. The method includes: coupling an optical coupler to a light signal output of a light source at a first port, to a first optical collimator at a second port, and to a second optical collimator at the third port; directing a first light beam from the second port of the optical coupler onto a sample by the light collimator through a Dichroic mirror and a microscope objective, wherein the sample is placed on a substrate supported by an adjustable microscopy stage; directing a second light beam from the third port of the optical coupler onto a retroreflector; capturing the reflected first light beam off of the substrate and sending to a spectrometer through the first optical collimator and into the second port and out of the fourth port of the optic coupler; capturing the reflected second light beam off of the retroreflector and sending to a spectrometer through the second optical collimator and into the third port and out of the fourth port of the optic coupler; generating a control signal for moving the position of the adjustable microscopy stage based on an interference signal from the reflected first and second light beams.

DETAILED DESCRIPTION OF THE PREFERRED EMBODIMENTS

Figure 1:
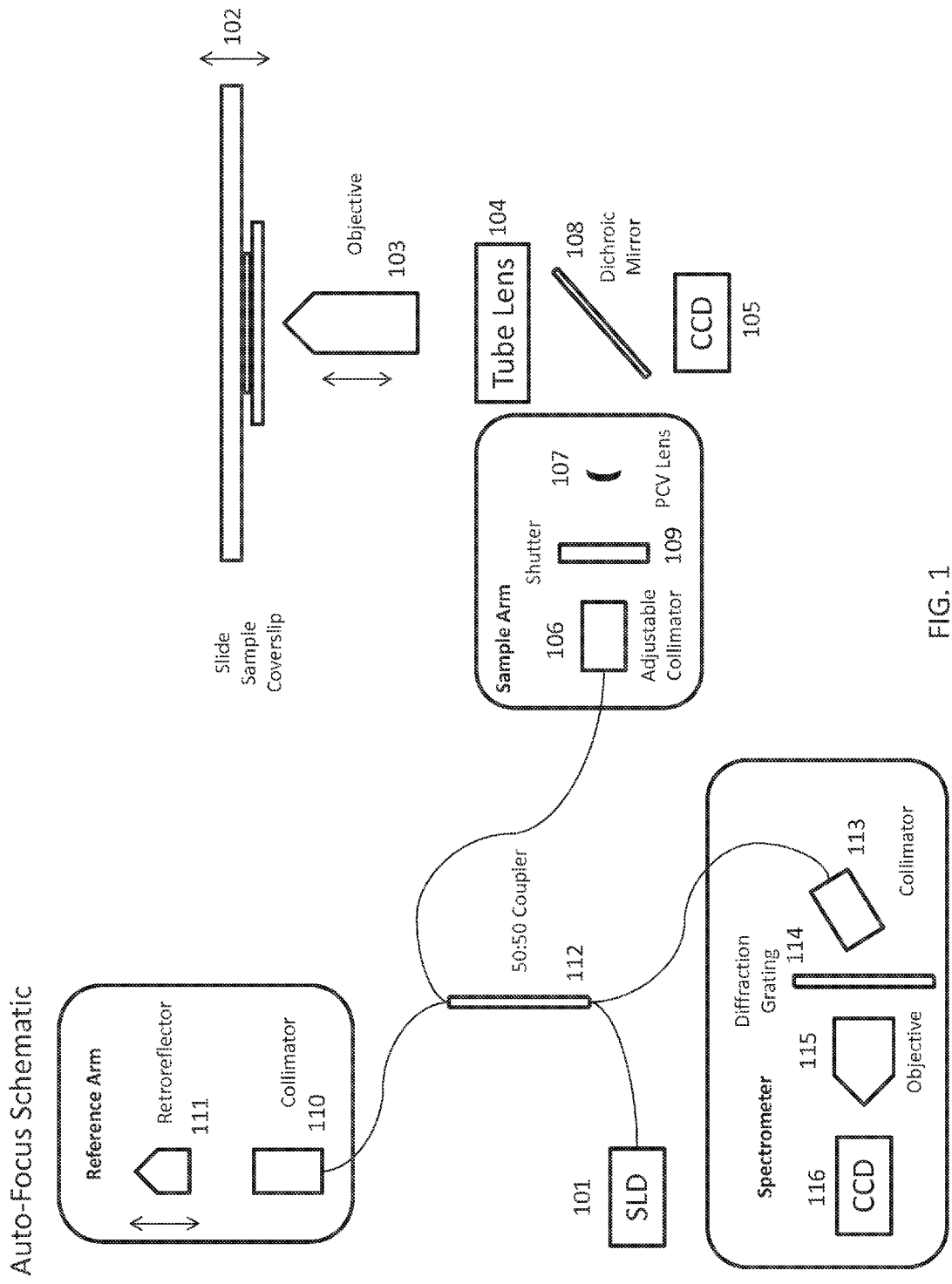
FIG. 1 is a diagram of an autofocus apparatus according to an embodiment.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts. It is to be noted that all fiber optic systems can be replaced with free space equivalents.

In microscopy, a sample object to be examined is placed on a slide and is cover by a slip cover. The objective of a microscope is adjusted so that a focused view of the magnified object is obtained. When light traveling in a first medium having a first refractive index enters into a second medium having a second reflective index, reflection occurs at the boundary between the two media. The amount of light that gets reflected and the amount of light that gets transmitted at the boundary depend on the refractive indices of the two media. In microscopy, there are typically many different boundaries, e.g. air-glass, glass-water, water-glass, and glass-air, and thus there are different reflection intensity levels corresponding to these boundaries.

The device according to an embodiment is capable of detecting the position of a sample on a microscope. The sample may consist of a specimen mounted between a microscope slide and coverslip or specimens within a well plate. The device tracks the position of a sample by identifying refractive index boundaries through Fresnel reflections. A change in refractive index can correspond to the top and bottom of a coverslip, the top of a slide, the bottom of a well plate or the bottom of a well within a well plate. Using optical coherence tomography (OCT) these reflections are used to form a depth scan of the sample which gives the positions of these surfaces relative to the objective. The device functions as an autofocus system by compensating for any variation of the position of the sample from the focal plane of the objective.

The device has 5 major components:
1. Microscope, which is used to image the sample mounted on a Z-axis piezo stage.
2. Sample arm, which is one of two arms used to create the interference signal needed for position detection. This can be introduced before or after the tube lens on the microscope.
3. Reference arm, which is the second arm used to create the interference signal. This arm is also used to compensate for different path lengths introduced by different objectives and to separate physical features for auto-correlated signals.
4. Base unit, which provides the surface detection through the use of OCT. The base unit contains the elements needed for obtaining and analyzing the depth scan from the sample.
5. Computer, which contains the NI-DAQ card and software used for obtaining and analyzing the signal. Based on measurements made in the software a correction signal can be applied to the z-axis piezo stage keep the sample in the focal plane of the objective.

FIG. 1 shows the microscope and the sample arm with an imaging path and the sample arm path. The image path includes a light source 101, such as a semiconductor laser diode (SLD), which provides illumination to the sample, which is placed on a sample stage 102. The sample stage is capable of moving in x, y and z directions. For example, the sample stage includes a motorized x-y stage and a z-axis piezo stage. The objective 103 can include a range of types and magnification for specific viewing needs. The tube lens 104 directs the light to a camera 105, such as a CCD, for taking image of the sample.

In one embodiment, the sample arm includes a 780HP APC Nufern fiber from the base unit, a paddle polarization controller, an adjustable APC collimator 106, a plano-concave lens 107, a dichroic mirror 108 that transmits visible and reflects IR. The dichroic mirror can be introduced either between the camera and the tube lens, or between the tube lens and the objective. In the latter case the plano-concave lens is not needed. FIG. 1 also shows a shutter 109.

In one embodiment, the reference arm includes a 780HP APC Nufern fiber from base unit, a paddle polarization controller, a fixed focus APC collimator 110, a motorized stage to alter the path length to a retroreflector 111.

In one embodiment, the base unit includes a superluminescent light source. For example, the light source preferably has an output power of 2.5 mW, a central wavelength of 930 nm and a spectral range of 90 nm. The base unit also includes a 50:50 fiber coupler 112 that couples to the SLD through its first port, a sample arm through its second port, a reference arm through its third port, and a collimator to a spectrometer through its fourth port. In one embodiment, the base unit also includes driving electronics that provides a constant current driver for SLD, a servo loop controlled Peltier cooler, a heater driver, and a spectrometer image sensor driver. In one embodiment, the spectrometer includes a fiber collimator 113, a diffraction grating 114, an objective 115, and a camera 116. In one embodiment, the system computer includes a NI-PCIe-6351 DAQ controller, and application software configured to perform the signal detection and controls.

Figure 2:
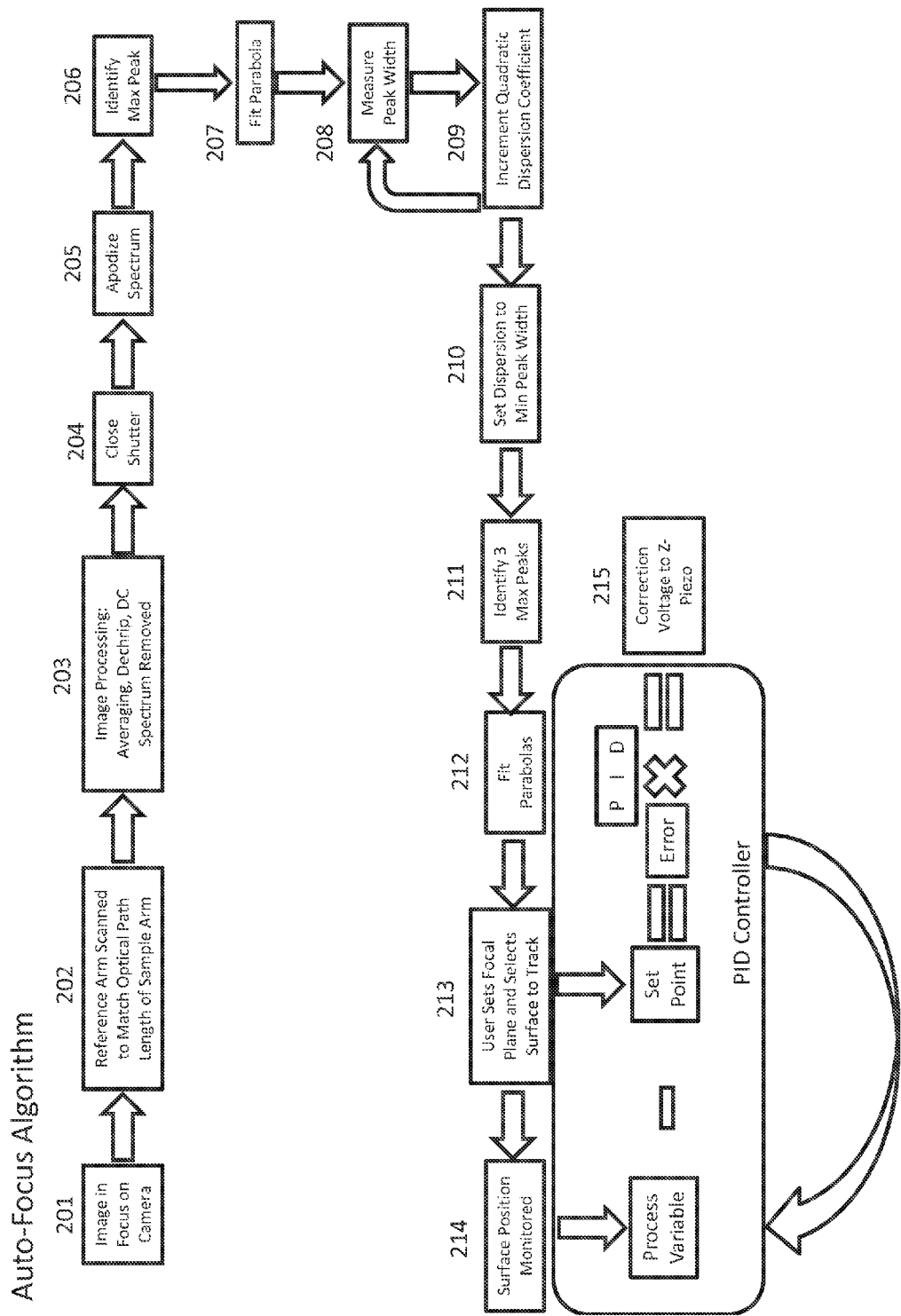
FIG. 2 is a diagram of an autofocus algorithm according to an embodiment.

FIG. 2 shows the operation flow of the autofocus system according to an embodiment. In step 201, the image is adjusted to be in focus of the camera. In step 202, the reference arm is scanned to match the optical path length of the sample arm. Once peaks are visible, the reference arm is scanned to bring the strongest peaks into view on the A-scan. Step 203 is the image processing, in which the signal is dechirped, the DC spectrum is removed, and the spectrum is averaged over 40 cycles.

Apodization is then performed. In step 204, the mechanical shutter is closed to block the laser in the sample arm after the collimator. In step 205, the spectrum is apodized through software.

Dispersion compensation is then performed. In step 206, maximum peak is identified on the spectrum. In this case, the position resolution is limited to pixel width (3.351 um). In step 207, a parabola is fitted to the max data point and the two adjacent data points to provide sub-pixel resolution. In step 209, the peak width is measured. In step 209, a numerical quadratic dispersion coefficient is incremented and plotted against the peak width. In step 201, the dispersion coefficient is set to give the minimum peak width.

The sample peak detection is then performed. In step 211, the three max peaks are identified. In step 212, the parabola fit method is applied to all three peaks as described above.

Peak tracking is then performed. In step 213, the user adjusts the objective to focus the image on the camera. User commands the software to track the current position of the top of the slide (third peak in A-scan). This position becomes the set point. In step 214, the position of the top of the slide is monitored. This position is the process variable. The process variable is subtracted from the set point to produce an error value.

As the peak position changes the error changes to reflect the displacement of the sample from the focal plane of the objective. In step 215, a PID control loop is used to supply a voltage based on the error to the Z-piezo stage. The voltage changes the position of the sample. The voltage is changed to minimize the value of the error. Minimizing the error allows the position of the sample to remain in the focal plane of the objective.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An autofocus apparatus, comprising:
   a light source;
   an optical coupler having a first port, second port, a third port and a fourth port;
   wherein light output from the light source is coupled to the first port and splits into a first light beam and a second light beam, the first light beam being output to the second port and the second light beam being output to the third port, and wherein the forth port is coupled to an input of a spectrometer;

a first optical collimator for directing the first light beam from the second port of the optical coupler onto a sample through a dichroic mirror and a microscope objective, wherein the sample is placed on a substrate supported by an adjustable microscopy stage;

a second optical collimator for directing the second light beam from the third port of the optical coupler onto a retroreflector;

wherein the first light beam reflected from the sample is directed back into the second port and out of the fourth port, and second light beam reflected from the retroreflector is directed back into the third port and out of the fourth port;

wherein the spectrometer output control signals to control the adjustable microscopy stage based on a parabolic fit of three peaks identified in an interference signal from the reflected first and second light beams.

2. The apparatus of claim 1, wherein a position of the retroreflector is adjusted to cause the optical path of the second light beam to match the optical path of the first light beam.

3. The apparatus of claim 1, wherein the adjustable microscopy stage comprises a motorized x-y stage and a z-axis piezo stage.

4. The apparatus of claim 1, wherein the optical coupler is a 50:50 fiber coupler.

5. The apparatus of claim 1, wherein the spectrometer comprises a fiber collimator to direct light to a diffraction grating; an objective lens that focuses the diffracted light onto a camera.

6. The apparatus of claim 1, further comprising a mechanical shutter that closes to block the first light beam into the sample after the first collimator.

7. A method for automatically operating an autofocus apparatus, the method comprising:

coupling an optical coupler to a light signal output of a light source at a first port, to a first optical collimator at a second port, and to a second optical collimator at a third port;

directing a first light beam from the second port of the optical coupler onto a sample by the first optical collimator through a dichroic mirror and a microscope objective, wherein the sample is placed on a substrate supported by an adjustable microscopy stage;

directing a second light beam from the third port of the optical coupler onto a retroreflector;

capturing the reflected first light beam off of the substrate and sending to a spectrometer through the first optical collimator and into the second port and out of a fourth port of the optical coupler;

capturing the reflected second light beam off of the retroreflector and sending to a spectrometer through the second optical collimator and into the third port and out of the fourth port of the optical coupler;

generating a control signal for moving the position of the adjustable microscopy stage based on a parabolic fit of three peaks identified in an interference signal from the reflected first and second light beams.

8. The method of claim 7, further comprising adjusting a position of the retroreflector such that the optical path of the second light beam to match the optical path of the first light beam.

9. The method of claim 7, wherein the spectrometer comprises a fiber collimator to direct light to a diffraction grating; an objective lens that focuses the diffracted light onto a camera.

10. The method of claim 7, further comprising closing a mechanical shutter to block the first light beam into the sample after the first collimator.

11. The method of claim 7, further comprising
setting a position of the sample corresponding to one peak as a set point;
monitoring the position of the sample;
subtracting a current position of the sample from the set point to produce an error value;
moving the position of the adjustable microscopy stage to minimize the error value.

* * * * *